United States Patent [19]

Bawa et al.

[11] Patent Number: 5,072,072

[45] Date of Patent: Dec. 10, 1991

[54] ELECTRICAL CONNECTOR FOR LIQUIDTIGHT CONDUIT

[75] Inventors: Jaspal S. Bawa, Neshanic Station; Luis R. Couto, Hillside; Giacomo F. Mancini, Piscataway, all of N.J.

[73] Assignee: Thomas & Betts Corporation, Bridgewater, N.J.

[21] Appl. No.: 498,293

[22] Filed: Mar. 23, 1990

[51] Int. Cl.$^5$ .................................. H02G 15/20
[52] U.S. Cl. ............................... 174/65 SS; 285/161; 285/243
[58] Field of Search .................... 174/65 SS; 285/161, 285/243, 322, 343

[56] References Cited

U.S. PATENT DOCUMENTS

| | | | |
|---|---|---|---|
| 2,561,827 | 7/1951 | Soos | 285/86 |
| 3,184,706 | 5/1965 | Atkins | 339/177 |
| 3,243,206 | 3/1966 | Samer | 285/162 |
| 3,394,954 | 7/1968 | Sarns | 285/319 |
| 3,624,591 | 11/1971 | Buberniak | 339/103 R |
| 3,659,880 | 5/1972 | Goldsobel | 285/161 |
| 3,749,424 | 7/1973 | Greene | 285/161 |
| 3,958,818 | 5/1976 | Mason | 285/92 |
| 4,209,661 | 6/1980 | Pate et al. | 174/65 R |
| 4,225,162 | 9/1980 | Dola | 285/161 |
| 4,293,178 | 10/1981 | Lee | 339/103 R |
| 4,451,069 | 5/1984 | Melone | 285/86 |
| 4,481,697 | 11/1984 | Bachle | 24/135 R |
| 4,842,548 | 6/1989 | Bolante | 439/461 |
| 4,900,068 | 2/1990 | Law | 285/161 |

FOREIGN PATENT DOCUMENTS 0031409 7/1981 European Pat. Off.

OTHER PUBLICATIONS

Thomas-Betts Electrical Construction and Maintenance Products, Electrical Division, pp. 170-172, 189-195, 203-204, 215-217, 233, dated 1988.
Heyco Molded Products, Inc. Advertisement Entitled "Heyco® Hi-Flex ™ II: The Installer Friendly Liquid Tight Connector/Conduit System", undated, 1 page.
Arlington Industries, Inc. Advertisement, Entitled "Straight and 90° Angle Connectors for Liquid-Tight Flexible Non-Metallic Conduit", 1 page, dated 1989.
Hubbell, Inc. Installation Instructions Entitled "Liquid-Tight Flexible Non-Metallic Conduit Connectors", 1 page, dated Aug., 1986.
Oz-Gedney Installation Instructions, Entitled "4Q-P" Non-Metallic Liquid Tight Connectors; undated, 1 page.

Primary Examiner—Leo P. Picard
Assistant Examiner—David A. Tone
Attorney, Agent, or Firm—Robert M. Rodrick; Salvatore J. Abbruzzese

[57] ABSTRACT

An electrical connector for connecting liquidtight flexible electrical conduit to an electrical component such as a junction box or outlet, comprises a two-piece, all plastic construction. The connector comprises a plastic body and a plastic gland nut threadably attached thereto. The body includes a plurality of flexible fingers, each of which has thereon a pair of friction-reducing ridges that engage an inner contact surface of the gland nut in tangential, point-contact. As such, upon tightening of the gland nut on the connector body, the gland nut engages the resilient fingers with minimal friction loss, thereby enhancing hand tightening or minimizing the torque required with a tightening tool. In addition, the connector body includes an inner tubular ferrule which defines a conduit supporting surface which includes thereon friction-reducing elements. Such friction-reducing elements permit greater hand insertion and stretching of the conduit onto the connector body to achieve a liquidtight seal between the inner surface of the conduit and the connector body.

23 Claims, 4 Drawing Sheets

ELECTRICAL CONNECTOR FOR LIQUIDTIGHT CONDUIT

FIELD OF THE INVENTION

The present invention relates to electrical connectors, and more particularly to liquidtight connectors which connect electrical components, such as junction boxes or outlet boxes with liquidtight flexible conduits.

BACKGROUND OF THE INVENTION

Liquidtight flexible conduit is used in many applications, including industrial applications, to protect electric current-carrying wires. The wires, which may be bare or covered by insulation, are pulled through the conduit which is typically tubular and has an axial bore. As such, the wires contained in such conduit may be protected from the environments in various applications. Externally, the conduit may be smooth or convoluted.

Various electrical connectors for connecting flexible conduit to electrical components and for providing a liquidtight seal thereto are known. Connectors of this type may be formed of metal, plastic or both metal and plastic. For example, U.S. Pat. No. 4,842,548 issued to Bolante on June 27, 1989 shows an all-plastic connector while U.S. Pat. No. 3,659,880 issued to Goldsobel on May 2, 1972 shows a connector with portions made of plastic and metal. In addition to these known devices, in an effort to provide a liquidtight seal against chemical or liquid environments in industrial applications and to enhance the pull-out resistance of the flexible conduit from the connector, various other known connector constructions have been developed. For instance, connectors having flexible fingers, conduit engagement portions with screw threads for attachment to conduit, gripping serrations or teeth and deformable wedges are all known. However, in addition to considering cost as well as providing a reliable liquidtight seal with high conduit pull-out resistance, ease of installation is also desirable. Accordingly, for use particularly in the field, a more efficient use of tightening techniques wherein easy tightening can be effected by either hand or tools is advantageous.

SUMMARY OF THE INVENTION

It is an object of the present invention to provide an improved electrical connector for connection to electrical components and liquidtight electrical conduit.

It is a further object of the present invention to provide an electrical connector wherein connection to liquidtight electrical conduit is effected in a friction-reduced manner.

In accordance with a preferred arrangement of the subject invention, an electrical connector for connecting liquidtight electrical conduit to an electrical component is provided. The connector comprises a body including a component connecting portion, a flange portion and a conduit connecting portion with a bore extending axially therethrough. The component connecting portion projects axially from the flange portion in one direction and comprises external thread means for connecting the body to an electrical component. The conduit connecting portion projects axially from the flange portion in a direction opposite the component connecting portion. The conduit connecting portion includes an elongate internal tubular ferrule through which the body bore extends and an outer cylindrical ring. The ferrule and the ring are radially spaced and define therebetween a cavity. The ring includes external threads and a plurality of flexible fingers projecting generally axially therefrom. The flexible fingers include thereon friction-reducing means.

A gland nut is included in the electrical connector, the gland nut having a centrally located bore therethrough. The gland nut includes internal threads engageable with the external threads on the body ring. A tapered contact surface is included on the interior of the gland nut. The cavity between the body ferrule and ring and the gland nut bore are adapted to receive a liquidtight conduit. The gland nut internal threads are threadably engageable with the ring external threads to join the nut to the body. The tapered contact surface on the interior of the gland nut is cooperatively engageable with the friction-reducing means on the fingers upon threadably tightening a nut on to the body. The fingers are thereby readily urged into compressed engagement with the conduit, thereby securing the conduit to the body and providing a liquidtight connection therebetween.

In accordance with another form of the invention, the tubular ferrule in the connector body includes a conduit supporting surface. The conduit supporting surface includes thereon friction-reducing means for engageably receiving an interior surface of a liquidtight conduit.

In a further aspect of the invention, the gland nut includes means for tightening the internal threads thereof to the external threads of the body ring, the gland nut tightening means preferably including a plurality of grooves extending therein to facilitate hand tightening.

DETAILED DESCRIPTION OF THE PREFERRED EMBODIMENTS

Figure 1:
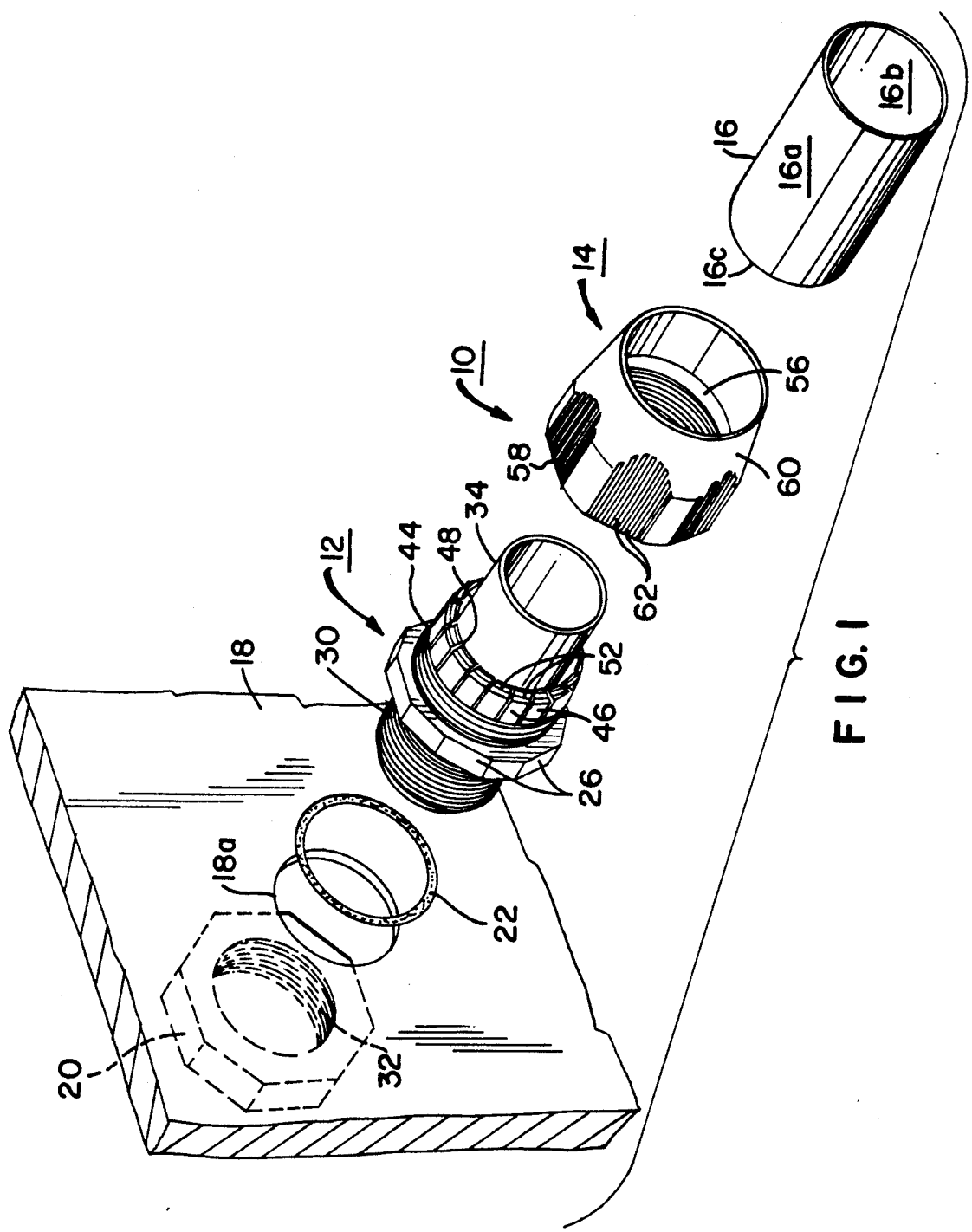
FIG. 1 is a perspective, exploded view of a preferred embodiment of the connector of the subject invention showing a portion of a flexible liquidtight conduit and a panel of an electrical component to which the connector is to be connected.

Referring now to the drawing, there is shown in FIG. 1 an electrical connector 10 in accordance with a preferred form of the invention. The connector 10 is a two-part, all-plastic connector comprising a body 12 and a gland nut 14. The connector 10, as will be described more fully hereinbelow, is particularly adapted to connect in liquidtight manner to a flexible, liquidtight conduit 16 which may have a smooth exterior surface 16a, as shown, or a convoluted surface. The conduit interior surface 16b is smooth. The connector body 12 is particularly adapted for liquidtight connection to a panel of an electrical component, such as an electrical outlet or junction box by means of a lock nut 20 and an elastomeric O-ring 22 which is resiliently compressed between the body 12 and the panel 18.

Figure 2:
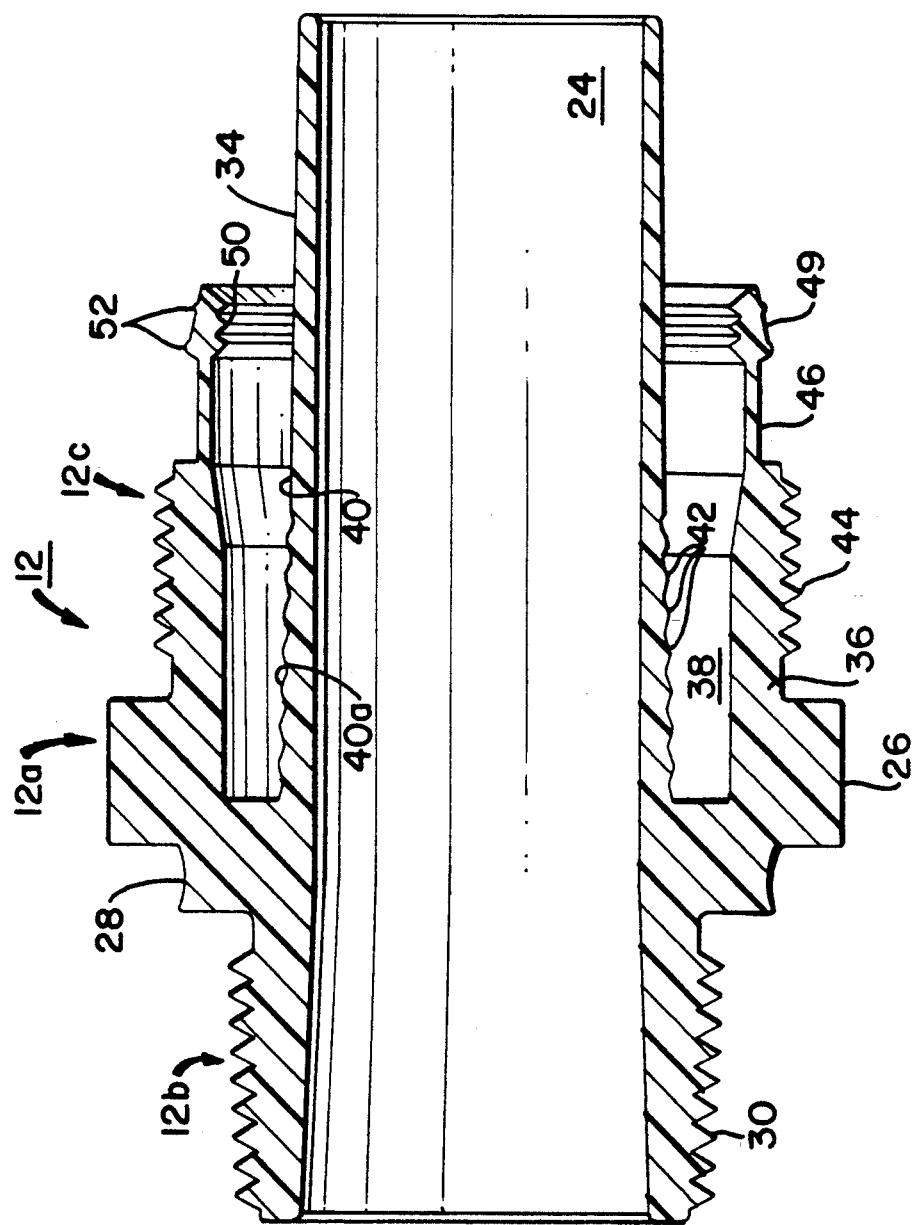
FIG. 2 is a longitudinal cross-section of the body of the electrical connector of FIG. 1.

Turning now also to FIG. 2, the details of the connector body may be more fully understood. The connector body 12 is preferably formed of one-piece construction of insulative material, preferably plastic, such as nylon. The body 12 is of generally hollow cylindrical construction comprising a centrally located flange portion 12a a component connecting portion 12b projecting from the flange portion 12a in one direction and a conduit connecting portion 12c projecting from the flange portion 12a in the opposite direction. An axial bore 24 extends fully through the body 12. The flange portion 12a extends generally transversely to the axially extending bore 24 and, as shown in FIG. 1, comprises a plurality of flat surfaces 26, preferably in hexagonal configuration, to facilitate tightening to the panel 18 by a suitable tool or by hand. The flange portion 12a further includes a cradle 28 preferably having a concave surface for seating the elastomeric O-ring 22 thereon for providing a liquidtight seal between the body 12 and the panel 18 of the electrical component to which the connector 10 is attached.

The component connecting portion 12b includes a series of external threads 30 for mateable threadable engagement with the threads 32 of the lock nut 20, whereby the body 12 may be sealably secured to the electrical component panel 18. The threads 30 on the component connecting portion 12b of the body 12 are of diameter to fit through an opening 18a formed in the panel while the O-ring is compressed against the exterior surface of the panel 18 upon tightening the body 12 to the lock nut 20. Alternatively, interior threads may be provided on the inner surface of the opening 18a for engageable receipt of the threads 30 on the body connecting portion 12b.

The conduit connecting portion 12c includes a longitudinally extending, elongate, internal tubular ferrule 34 through which the axially extending bore 24 extends. Radially spaced from the tubular ferrule 34 is an outer cylindrical ring 36. The ferrule 34 and the ring 36 define a generally tubular cavity 38 therebetween, for receipt of the flexible conduit 16, as will be described in detail hereinafter.

The ferrule 34 includes an exterior surface 40 defining one wall of the cavity 38 for receiving and supporting thereon the interior surface 16b of the flexible conduit 16. As the ferrule exterior surface 40 extends into the cavity 38 toward the flange portion 12a, the outer diameter of the ferrule 34 increases, thereby providing a tapered surface 40a. Tapered surface 40a increases gradually outwardly toward the ring 36 in the direction deeper in the cavity 38 toward the flange portion 12a. In accordance with one aspect of the invention, on tapered surface 40a, there are provided a plurality of friction-reducing elements 42 thereon. In the preferred form of the invention, friction reducing elements 42 extend annularly around the tapered surface 40a and are longitudinally spaced and substantially parallel to each other. In this preferred construction, the tapered surface is provided with a plurality of recesses formed into the tapered surface 40a and circumferentially therearound. The outer surface portions of the surface 40a extending between the recesses define the friction reducing elements 42. It should be understood that the friction reducing elements may be defined by other structures, such as protrusions projecting outwardly from surface 40a and that the number of such friction reducing elements may vary in accordance with the preferred use.

The body ring 36 comprises external threads 44 at a location proximate the flange portion 12a. Disposed more distally from the flange portion 12a and projecting longitudinally outward from the threads 44 on ring 36 are a plurality of cantilevered, flexible fingers 46. As illustrated in FIG. 1, each finger 46 is separated from another finger 46 by a longitudinally extending slot 48. Each finger 46 terminates at its free distal end in a beveled outer surface 49. Disposed on the interior surface at the distal end of each finger 46 are relatively sharp teeth 50 or serrations for engagement with the outer surface 16a of conduit 16, as will be described. It should be appreciated that the number and shape of teeth 50 may vary.

Projecting outwardly from the beveled outer surface of each finger 46 are a pair of friction-reducing members 52. In the preferred configuration, the friction-reducing members 52 are defined by ridges which extend arcuately along the beveled surface 48 of each finger 46. The ridges 52 are substantially parallel to each other and are longitudinally spaced from each other on the beveled surface 49. Except for the spaces defined by the slots 48 between the fingers 46, the ridges 52 together extend substantially around the entire circumference of the body ring 36. Each ridge 52 comprises a generally curved surface having an apex which defines a point-contact for tangential engagement with the gland nut as will be described, in a manner to provide minimal bearing surface engagement with the gland nut upon tightening. Thus, an application of maximum force with minimum friction may be transmitted to the flexible fingers 46 upon tightening of the gland nut 14.

Figure 3B:
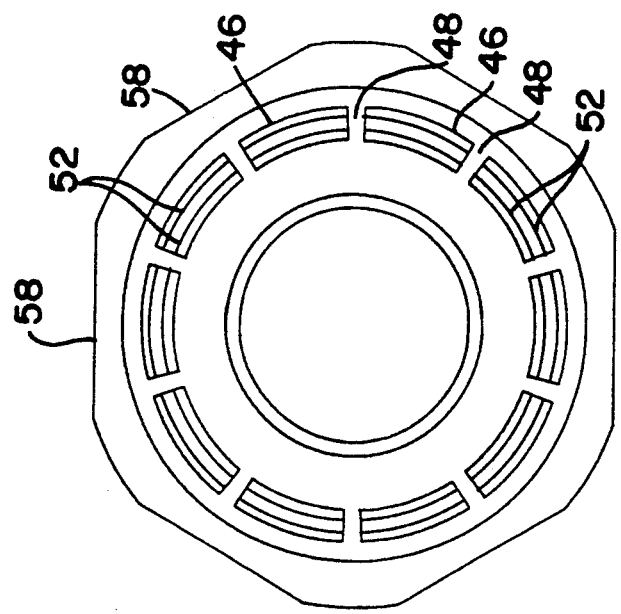
FIG. 3(b) is a plan view in schematic form of the connector in the pre-connected condition of FIG. 3(a).
Figure 3A:
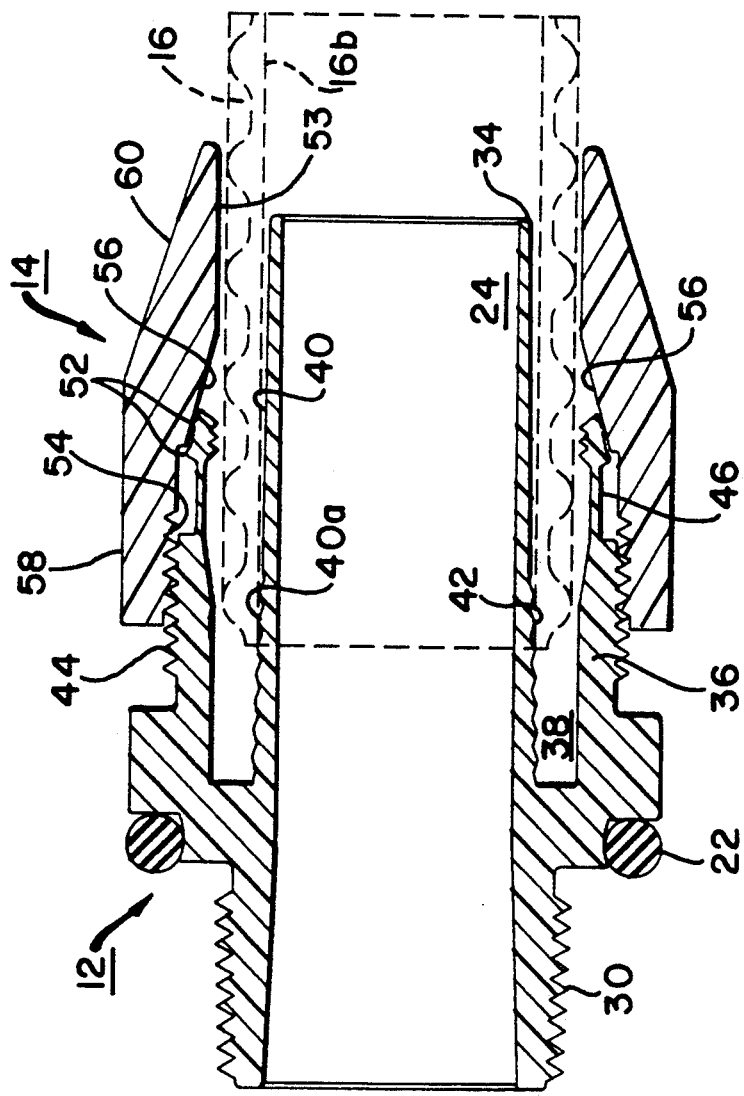
FIG. 3(a) is a longitudinal cross-sectional view of the connector of FIG. 1 showing the body and gland nut of the subject connector in a pre-connected condition to a flexible conduit.

Referring now to FIG. 1, FIG. 3(a) and FIG. 3(b), the details of the gland nut are described. The gland nut 14 is preferably formed in a unitary manner of insulative material, preferably plastic, such as nylon. Gland nut 14 has a central, axially extending bore 53 extending therethrough, for receipt of the conduit 16. Internal threads 54 are provided for mateable, threadable engagement with the ring external threads 44. On the interior of the gland nut 14 there is provided an inclined contact surface 56 of generally frusto-conical configuration and extending circumferentially around the interior surface of the gland nut 14.

The exterior surface of the gland nut 14 comprises a portion having a series of flat surfaces 58 and a generally smooth, frusto-conical outer surface 60. In the preferred arrangement, there are provided a plurality of longitudinally extending grooves 62 that provide gripping surfaces for facilitating handling of the gland nut and hand tightening to the connector body 12.

Figure 4B:
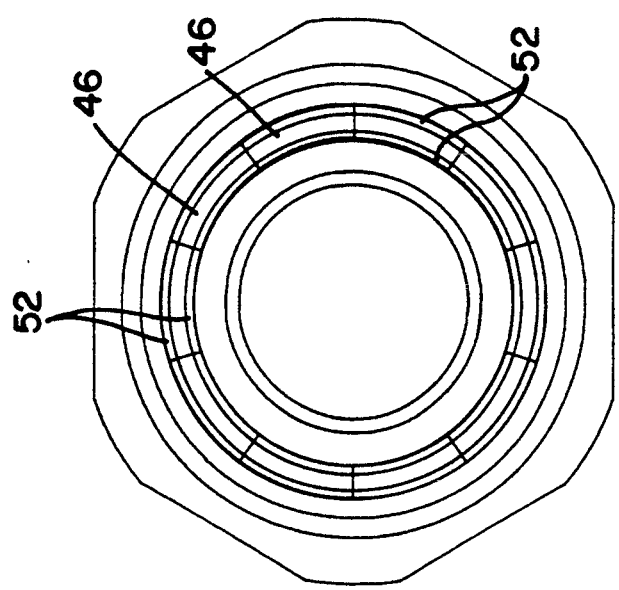
FIG. 4(b) is a plan view, in schematic form, of the electrical connector of 4(a) in connected condition.
Figure 4A:
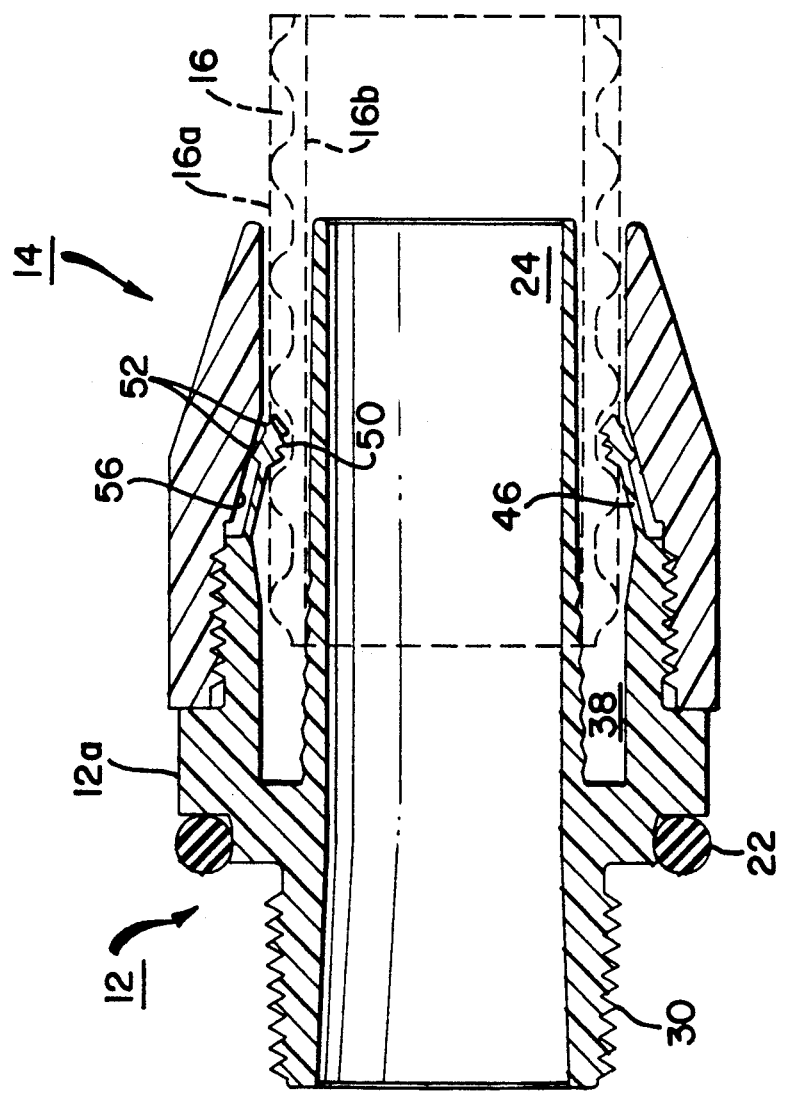
FIG. 4(a) is a longitudinal cross-section of the connector of FIG. 1 shown in connected condition to a flexible conduit.

The operation of the connector 10 is now described with further reference to FIGS. 4(a) and 4(b). The connector body 12 is attached to the panel 18 of an electrical component by means of threadably attaching the lock nut 20 to the external threads 30 on the body 12 which extend through the panel opening 18a. The O-ring 22 is compressed against the outer surface of the panel 18, thereby providing a suitable liquidtight seal. The gland nut 14 is inserted over an electrical conduit 16 with the outer surface 16a of the conduit being received through the centrally located bore 53 of the gland nut 14. The electrical wires (not shown) contained interiorly of a conduit 16 are pulled through the central bore 24 of the body 12 for subsequent electrical connection inside the electrical component. The interior surface 16b of the conduit 16 is slid onto the conduit supporting surface 40 of the body ferrule 34. The conduit is hand pushed onto the ferrule such that the conduit extends into the cavity 38. The interior conduit surface 16b, upon continued pushing, engages the tapered ferrule surface 40a and the friction-reducing elements 42 thereon. By means of the friction-reducing elements 42, the conduit, even though being radially stretched due to the movement along the outwardly tapering surface 40a, may be more readily hand inserted deeper into the cavity 38. As such, due to the radial stretching or flaring of the conduit along the tapered surface 40a, a suitable liquidtight seal between the inner conduit surface 16b and the body ferrule 34 may be achieved by hand insertion. Where, for example, the end surface 16c of the conduit is cut unevenly by a user in the field, this deeper insertion into the cavity 38 will allow more tolerance in establishing the desired liquidtight seal.

The gland nut 14 inner threads 54 are then threadably engaged with the ring external threads 44 as illustrated in FIG. 3(a). Initial engagement is established between the inclined interior surface 56 on the gland nut 14 and the friction-reducing ridges 52. As illustrated in FIG. 4(b), continued threadable tightening of the gland nut 14 on the body 12 causes the flexible fingers 46 to compress radially into engagement with the outer surface 16a of the conduit, thereby forcing the teeth 50 into gripping engagement with the conduit 16. During tightening of the gland nut 14 on the body 12, inasmuch as the gland nut surface 56 engages the ridges 52 in tangential contact, greater hand tightening of the gland nut may be effected to achieve the desired connection. The desired connection is achieved when the gland nut 14 engages the flange 12a as shown in FIG. 4(a). Inasmuch as various connector and conduit sizes may require a hand tool such as wrench to bottom the gland nut 14 against the flange 12a, due to the friction-reducing elements 52, less torque will be needed to achieve this condition, thereby providing ease of installation in the field. As further shown in FIG. 4(b), it should be noted that upon bottoming the gland nut 14 against the body flange 12a, the flexible fingers 46 are radially compressed in such a manner to circumferentially engage, or nearly engage, each other at the distal ends thereof. This condition, together with the radial compression of the teeth 50 on the fingers against the conduit 16, provide a liquidtight seal between the connector 10 and the conduit 16. It should be noted that in the desired connection with the subject connector 10, it is preferable that the conduit 16 does not bottom out against the flange portion 12a.

Having described the preferred embodiment of the subject connector and its operation, it should be understood that variations may be made thereto within the contemplated scope of the invention. For example, while it is preferable that the friction-reducing ridges 52 extend arcuately along the outer surface of each of the fingers 46, it can be appreciated that other friction-reducing members may be formed by either protrusions or recesses. In addition, while friction-reducing members are preferably included on each of the flexible fingers 46, it should be noted that, while full reduced friction may not be achieved as in the preferred embodiment, friction-reducing members may be included on only some of the fingers 46.

Furthermore, it should be understood that the body and gland nut described herein may be formed differently and be made of different materials than as described in the preferred embodiment. For example, the body need not necessarily be of integral, one piece construction, but may be a composite of both metal and plastic. Similarly, the gland nut may be made of metal. Accordingly, it should be understood that the preferred embodiment described herein is intended only in an illustrative rather than a limiting sense. The true scope of the invention is set forth in the claims appended hereto.

We claim:

1. An electrical connector for connecting liquidtight electrical conduit to an electrical component, comprising:

a body including a component connecting portion, a flange portion and a conduit connecting portion and a bore extending axially therethrough, said component connecting portion projecting axially from said flange portion in one direction and comprising external thread means for connecting said body to said electrical component, said conduit connecting portion projecting axially from said flange portion in a direction opposite said component connecting portion, said conduit connecting portion including an elongate internal tubular ferrule through which said body bore extends and an outer cylindrical ring, said ferrule and said ring being radially spaced and defining a cavity therebetween, said ferrule comprising a conduit supporting surface defining one wall of said cavity, said conduit supporting surface tapering outwardly toward said ring in the direction toward said flange portion, said tapering conduit supporting surface including friction-reducing elements thereon for engagement with an interior surface of a conduit, said ring including external threads and a plurality of flexible fingers projecting generally axially therefrom, each of said flexible fingers including thereon a friction-reducing ridge projecting outwardly from an outer surface of such fingers and extending arcuately along each said outer surface; and a gland nut having a centrally located bore therethrough, said gland nut including internal threads engageable with said external threads on said body ring and an inclined contact surface on the interior of said gland nut;

wherein said cavity and said gland nut bore are adapted to receive a liquidtight conduit, said gland nut internal threads being threadably engageable with said ring external threads to join said nut to said body, said inclined contact surface on said gland nut being cooperatively engageable with said friction-reducing ridges on said fingers upon threadably tightening said nut onto said body to radially urge said fingers into compressed engagement with said conduit, thereby securing said conduit to said body and providing a liquidtight connection therebetween.

2. An electrical connector according to claim 1, wherein the outer surfaces of each of said fingers is beveled.

3. An electrical connector according to claim 2, wherein said friction-reducing ridges on said fingers together extend substantially around a circumference of said ring.

4. An electrical connector according to claim 1, wherein each ridge comprises a generally curved exterior surface.

5. An electrical connector according to claim 1, wherein there are two said ridges on each said outer surface, said ridges being disposed substantially parallel to each other.

6. An electrical connector according to claim 9, wherein said friction-reducing elements extend annularly around said conduit supporting surface and substantially parallel to each other.

7. An electrical connector according to claim 6, wherein said conduit supporting surface has therein a plurality of annular, substantially, parallel spaced recesses, the outer conduit supporting surfaces between each recess defining the respective friction-reducing elements.

8. An electrical connector according to claim 1, wherein said gland nut comprises means for tightening said internal threads thereof to said external threads of said body ring.

9. An electrical connector according to claim 8, wherein said means for tightening includes flat sections on an outer surface of said gland nut.

10. An electrical connector according to claim 9, wherein at least one of said flat surfaces includes a plurality of grooves extending generally axially therein to facilitate hand tightening of said gland nut to said body.

11. An electrical connector according to claim 1, wherein said body comprises insulative material.

12. An electrical connector according to claim 1, wherein said gland nut comprises insulative material.

13. An electrical connector for connecting liquidtight electrical conduit to an electrical component, comprising:

a body including a component connecting portion, a flange portion and a conduit connecting portion and a bore extending axially therethrough, said component connecting portion projecting axially from said flange portion in one direction and comprising external thread means for connecting said body to said electrical component, said conduit connecting portion projecting axially from said flange portion in a direction opposite said component connecting portion, said conduit connecting portion including an elongate internal tubular ferrule through which said body bore extends and an outer cylindrical ring, said ferrule and said ring being radially spaced and defining a cavity therebetween, said ferrule including a conduit supporting surface defining one wall of said cavity, said conduit supporting surface including a surface portion tapering outwardly toward said ring in the direction toward said flange portion, said tapering surface portion having thereon friction-reducing means for engageably receiving an interior surface of a liquidtight conduit, said ring including external threads and a plurality of flexible fingers projecting generally axially therefrom; and a gland nut having a centrally located bore therethrough, said gland nut including internal threads engageable with said external threads on said body ring and engagement means on the interior of said gland nut;

wherein said cavity and said gland nut bore are adapted to receive a liquidtight conduit, said friction-reducing means on said conduit supporting surface adapted to slidably receive an interior surface of said liquidtight conduit, said gland nut internal threads being threadably engageable with said ring external threads to join said nut to said body, said engagement means on said gland nut being engageable with said fingers upon threadably tightening said nut onto said body to radially urge said fingers into compressed engagement with said conduit, thereby securing said conduit to said body and providing a liquidtight connection therebetween.

14. An electrical connector according to claim 13, wherein said friction-reducing means on said conduit supporting surface comprises at least one friction-reducing element thereon.

15. An electrical connector according to claim 14, wherein said at least one friction-reducing element extends circumferentially around said tubular ferrule.

16. An electrical connector according to claim 15, wherein there are plural such friction-reducing elements.

17. An electrical connector according to claim 16, wherein said conduit supporting surface has therein a plurality of spaced, annular recesses extending substantially parallel to each other, the outer conduit supporting surfaces between each recess defining the respective friction-reducing elements.

18. An electrical connection according to claim 13, wherein flexible fingers include thereon friction-reducing means.

19. An electrical connector according to claim 18, wherein said friction-reducing means on said fingers comprises a friction-reducing member projecting outwardly from an outer surface of each of said fingers.

20. An electrical connector according to claim 13, wherein said body comprises insulative material.

21. An electrical connector according to claim 20, wherein said body comprises an integral, one piece construction of insulative material.

22. An electrical connector according to claim 13, wherein said gland nut comprises insulative material.

23. An electrical connector according to claim 13, wherein said engagement means on said gland nut comprises an inclined contact surface.

* * * * *